July 30, 1940. E. O. ASHLEY 2,209,804
TRACTOR
Filed Dec. 2, 1937 5 Sheets-Sheet 3
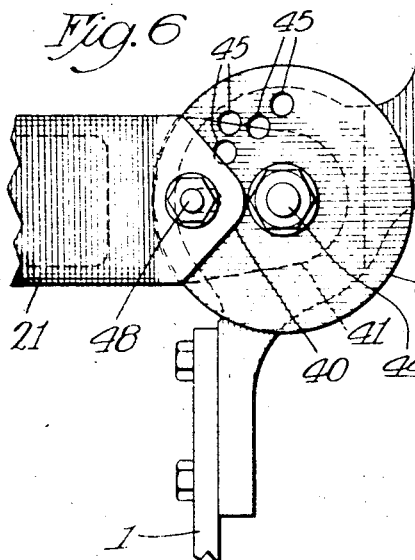
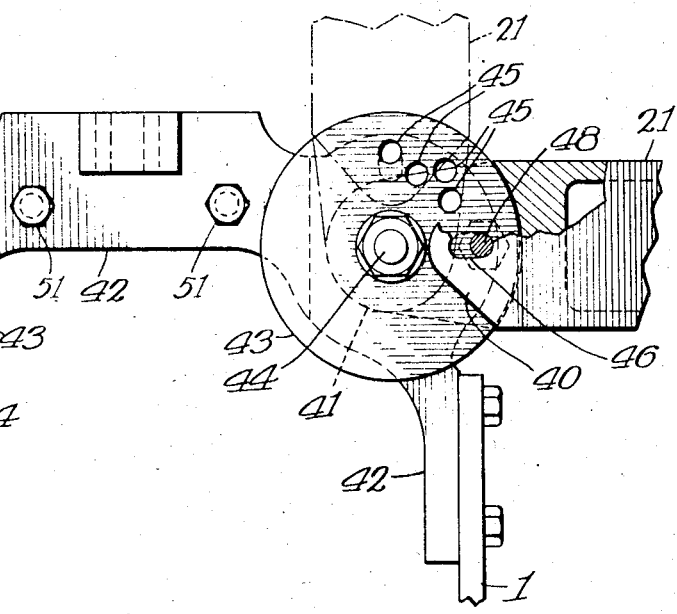
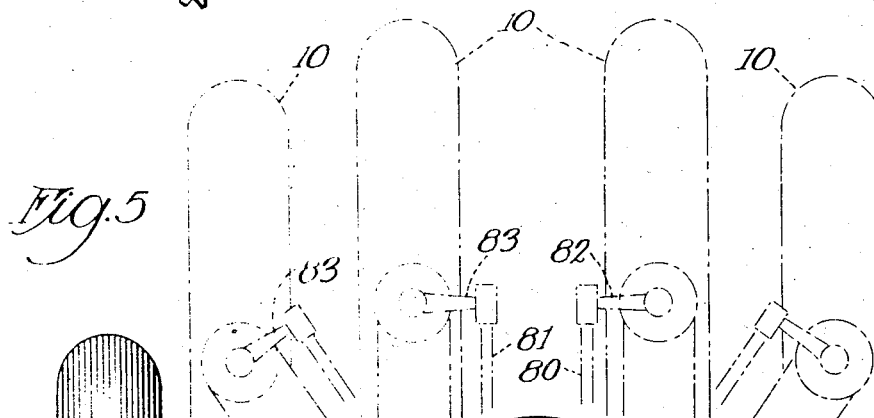
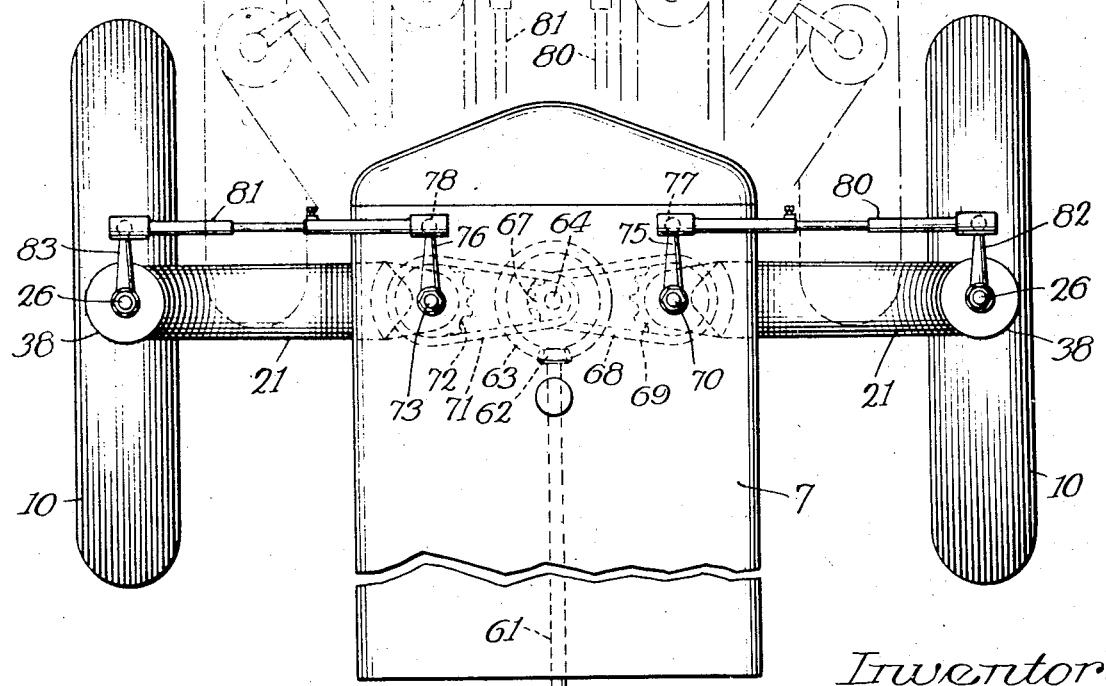
Inventor:
Edwin O. Ashley
By Davis Lindsey Smith & Shonts Attys.

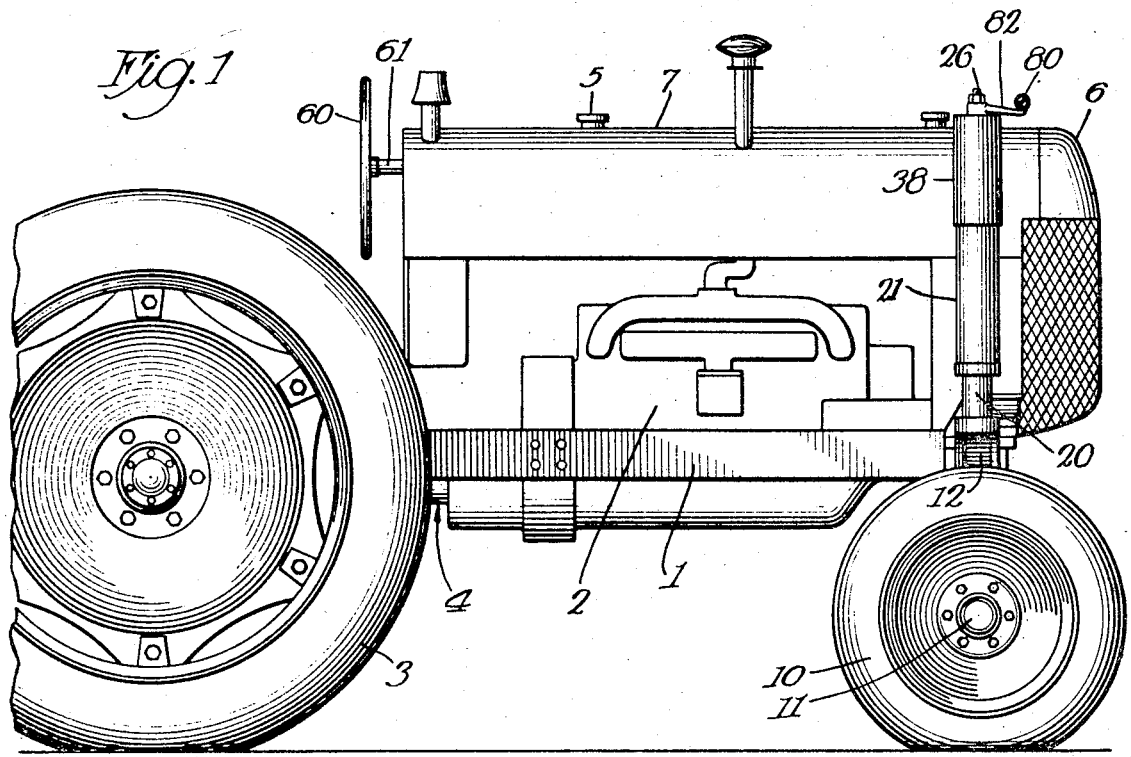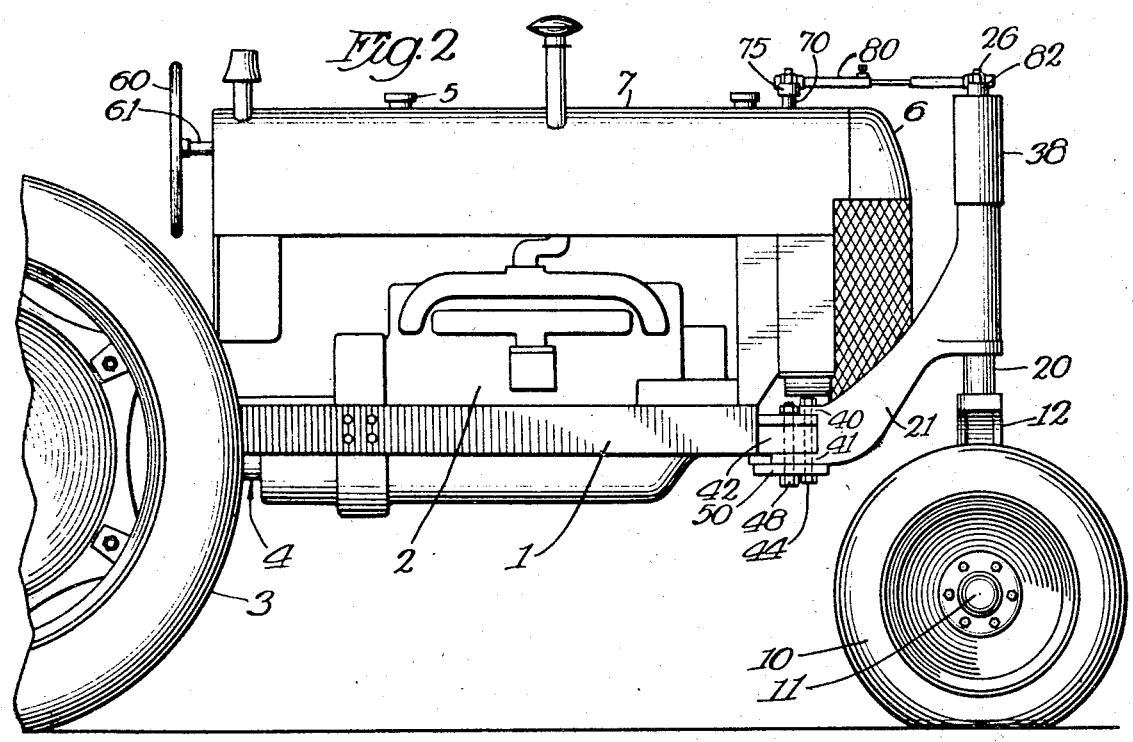

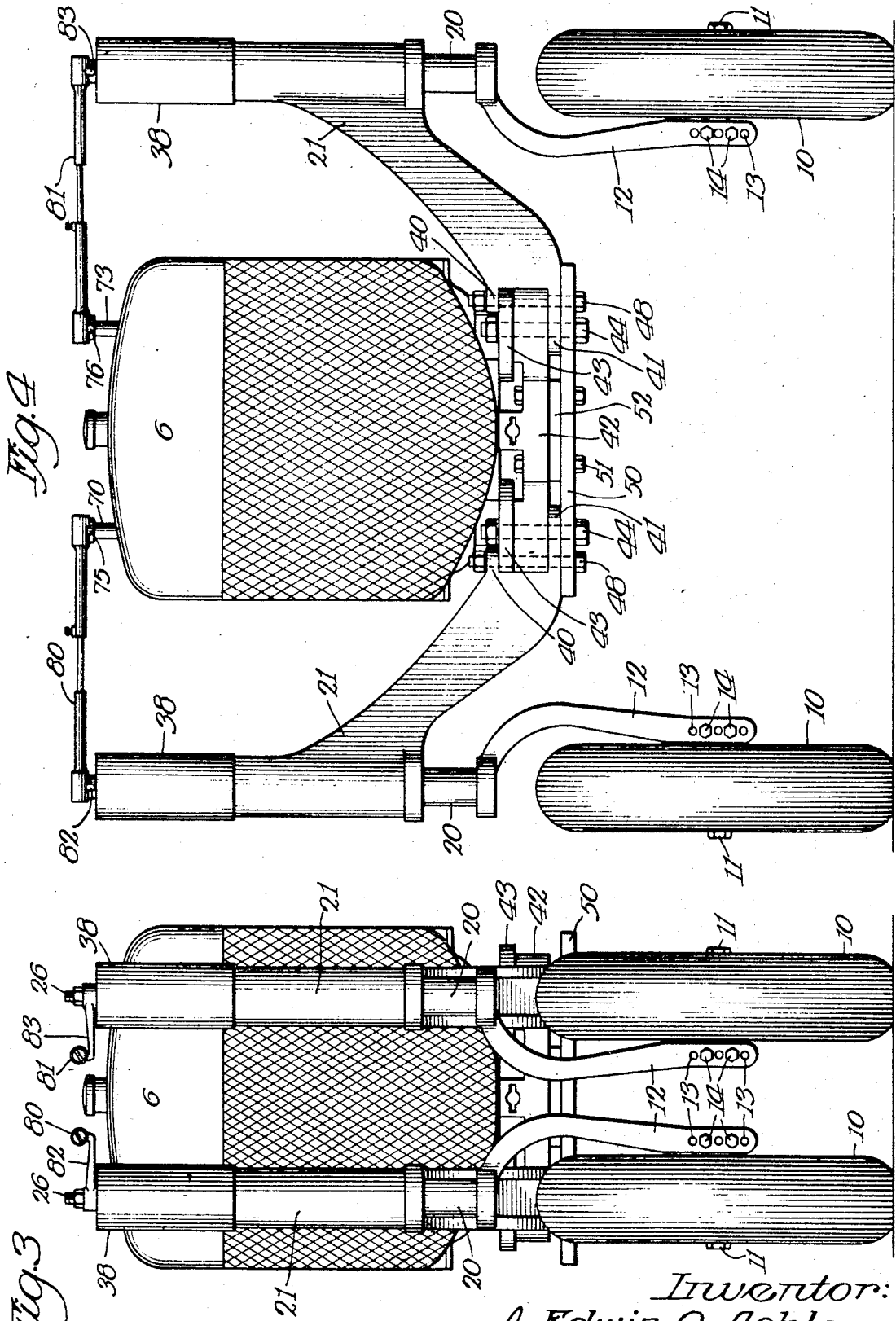

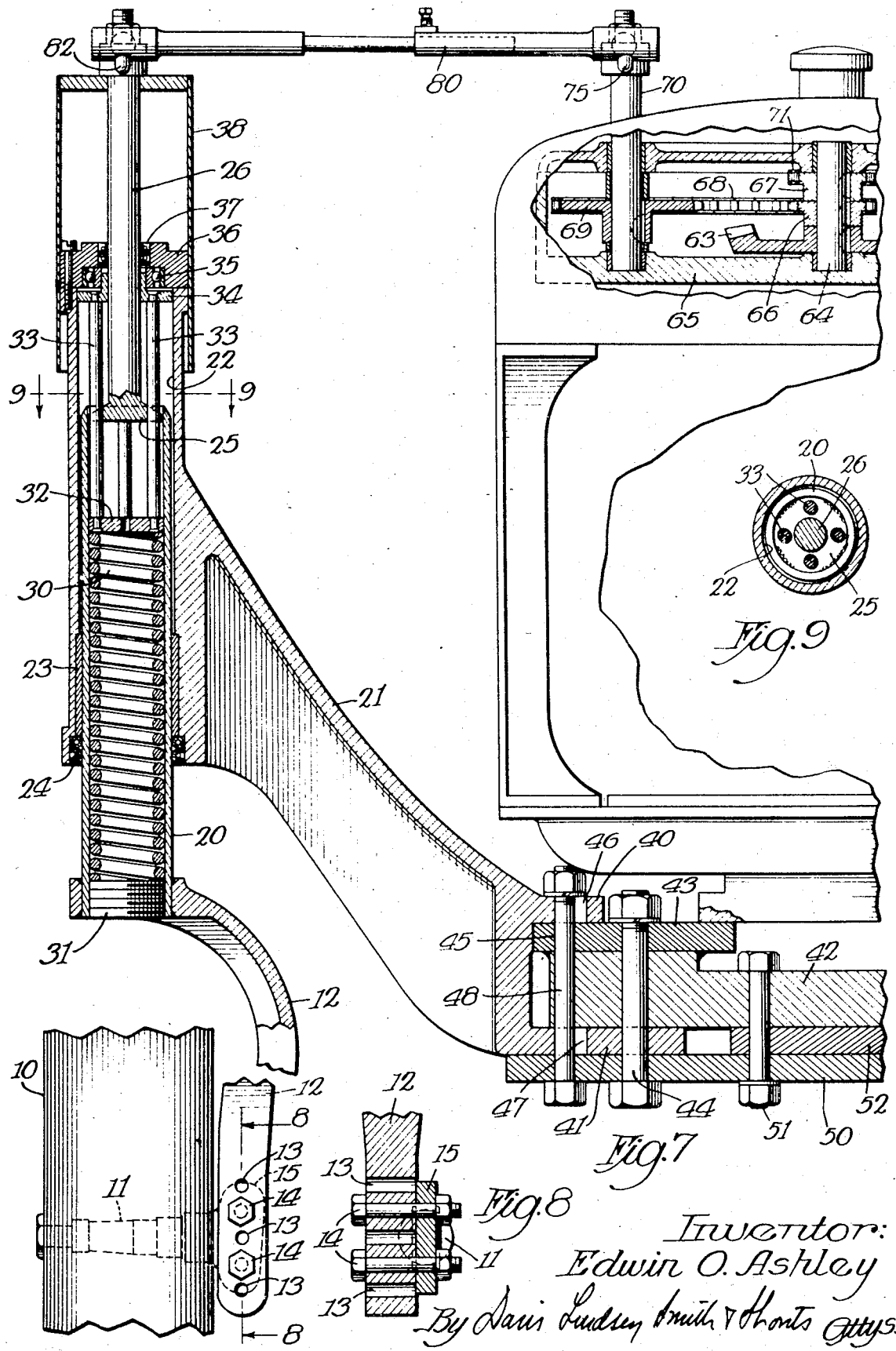

July 30, 1940.  E. O. ASHLEY  2,209,804
TRACTOR
Filed Dec. 2, 1937   5 Sheets-Sheet 5
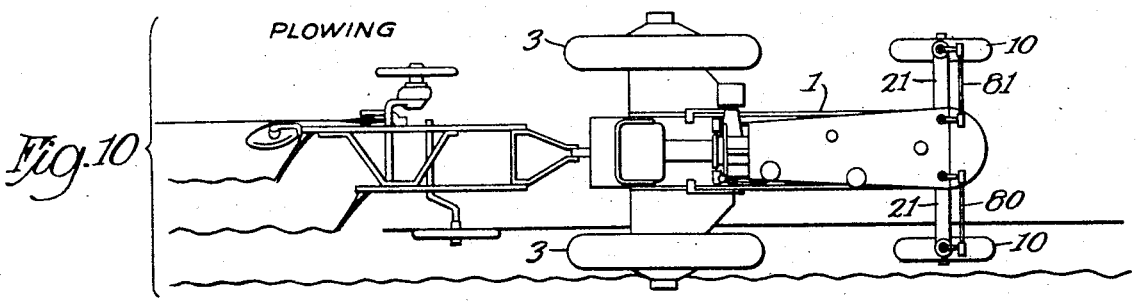
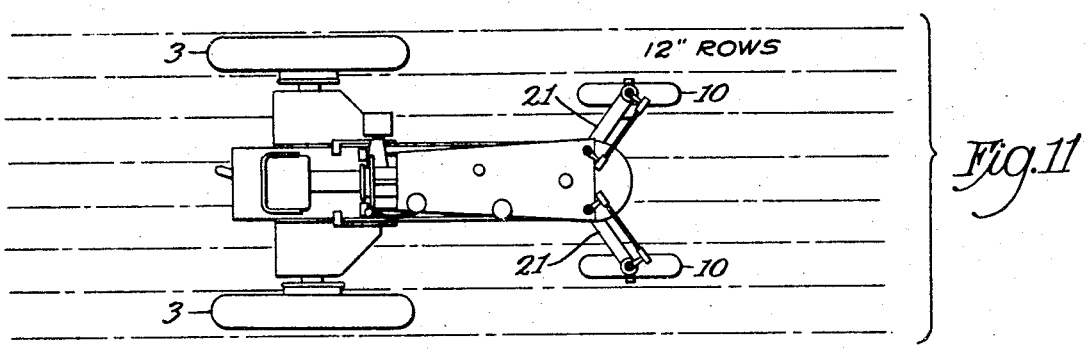
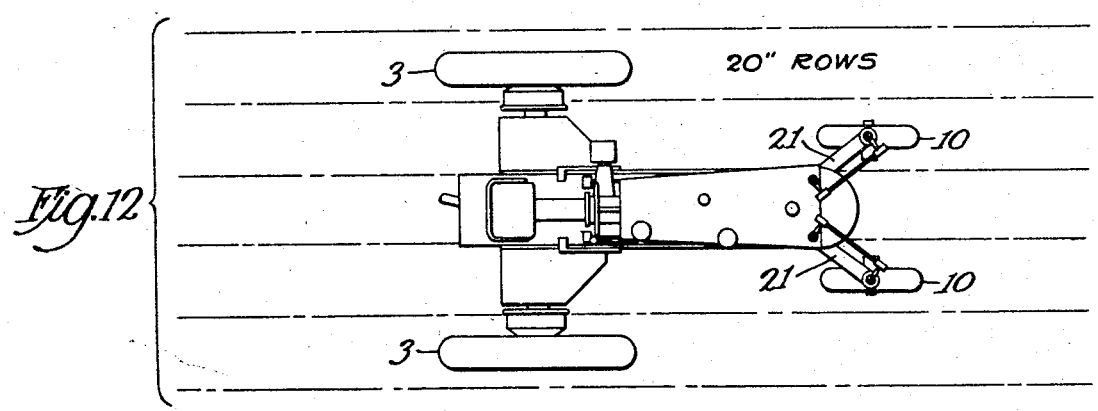
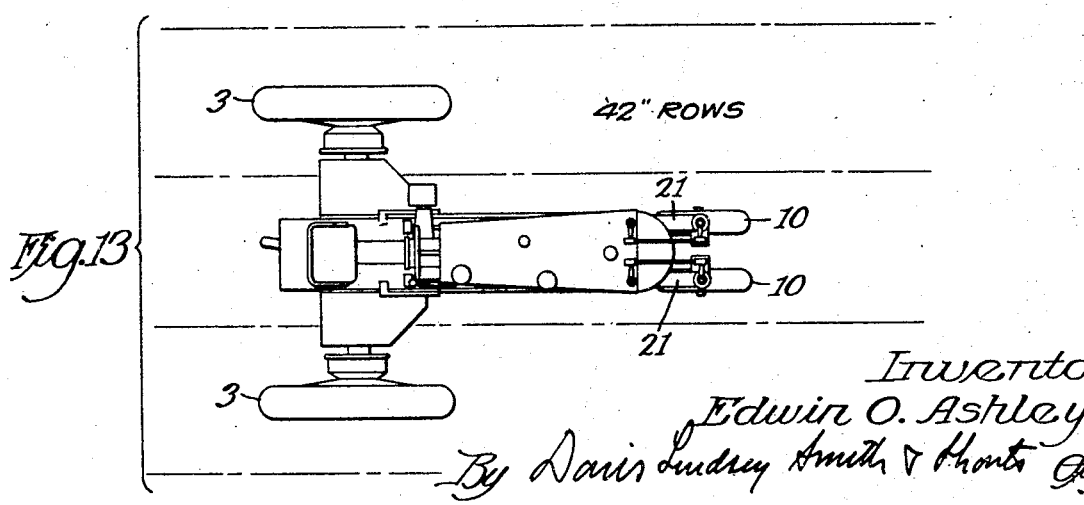
Inventor
Edwin O. Ashley
By Davis Lindsey Smith & Shonts Attys.

Patented July 30, 1940

2,209,804

UNITED STATES PATENT OFFICE 2,209,804

TRACTOR

Edwin O. Ashley, Peoria, Ill., assignor to Avery Farm Machinery Company, Peoria, Ill., a corporation of Illinois Application December 2, 1937, Serial No. 177,692

9 Claims. (Cl. 280—96.2)

This invention relates to tractors. It concerns the general construction of a tractor and principally the arrangement and mounting of the supporting wheels for making a tractor more efficient and more adaptable to a wide variety of uses.

Tractors of the wheel type used for farming are almost universally built with two rear drive wheels that are spaced relatively far apart and with one front wheel, or two front wheels mounted close together so as to form a single supporting unit, which unit, or wheel, is positioned on the longitudinal center line of the tractor. This wheel or unit supports the front end of the tractor and is used for steering. The spacing of the rear wheels can be varied by making certain adjustments but the front wheel or unit remains in the same position for all classes of work. When a tractor of this kind is used for cultivating row crops, the rear wheels straddle two or more rows and the front wheel or unit runs between two rows. This is satisfactory for certain types of row crops, but difficulty is encountered where the rows are fairly close together. Even though the two wheels of the front unit are positioned relatively close together, they occupy so much space that they run dangerously close to the row crops and damage to the plants occurs. This difficulty is increased when rubber tires are used, and they are being used quite frequently today. Another difficulty with a tractor of this kind is that, when it is used for plowing, one of the rear wheels runs in the furrow that is being plowed while the other rear wheel and the front wheel or unit runs on unplowed ground. This not only puts the tractor in a twisted position but it is necessary to hitch the plow to one side of the longitudinal center line of the tractor in order to get the proper draft on the plow. This puts a further strain on the tractor. Furthermore, the twisted position of the tractor, together with the side draft and together with the fact that the front wheel or unit runs on uneven unplowed ground, makes the tractor hard to steer. While these difficulties have been known, for a long time, they have been accepted as inevitable and all the leading tractors on the market today are built as above explained.

The present invention comprehends a solution of this problem, which will not only make a tractor easily adaptable to row crops of all kinds, but which will also enable the tractor to be used for plowing without putting the strains on it above explained, and which will permit easy steering.

The general object of the invention is to provide an improved tractor construction.

A more particular object is to provide an improved wheel mounting that will enable adjustments to be quickly and easily made so as to adapt the tractor to a wide variety of purposes.

Other objects and advantages of the invention will hereinafter appear.

An embodiment of the invention is shown in the accompanying drawings in which:

Figure 1 is a side elevation of the tractor with the front wheels in the position they occupy when the tractor is used for plowing;

Fig. 2 is a side elevation similar to Fig. 1 with the front wheels in the position they occupy when the tractor is used for certain row crops;

Fig. 3 is a partial front elevation showing the front wheels positioned closely together as they are used for certain row crops;

Fig. 4 is a partial front elevation of the tractor showing the front wheels spaced apart for plowing;

Fig. 5 is a partial plan view showing the steering mechanism and illustrating in dot and dash lines certain of the positions of the front wheels;

Fig. 6 is a partial plan view of the adjustable mounting for the front wheels;

Fig. 7 is a detailed sectional elevation showing the wheel mounting and a portion of the steering apparatus;

Fig. 8 is a section on the line 8—8 of Fig. 7;

Fig. 9 is a section on the line 9—9 of Fig. 7; and

Figs. 10, 11, 12 and 13 are diagrammatic plan views showing how the tractor may be used for plowing and for cultivating different row crops.

The tractor has a main frame 1 (Fig. 1) supporting an engine 2 which drives the rear wheels 3 through suitable driving connections 4. Located above the engine is a gas tank whose filling opening 5 is shown in Fig. 1. The radiator 6 for the engine is mounted at the front of the tractor and a top or cover 7 joins this radiator and extends over the gas tank and the upper part of the tractor to protect the parts and give the tractor a neat appearance.

The rear drive wheels 3 are of the disk type and they are dished or cone-shaped as illustrated in Fig. 10. The wheels are provided with a mounting such that the distance between them may be varied by reversing them on the rear axle and by adjusting them as illustrated in Figs. 10-13, inclusive. The wheels are spaced for plowing in Fig. 10 and for corn cultivation in Fig. 13 and, preferably, they are provided with large rubber tires as shown.

The present invention is concerned primarily with the construction of the front end of the tractor, particularly the mounting of the front wheels, and with the combination of such mounting and arrangement with the tractor as a whole. Instead of mounting the two front wheels as a unit, each is mounted separately so that it can be adjusted and controlled separately and so that it has independent action in supporting the weight on its side of the tractor.

The two front wheels 10 (Figs. 1 and 4) are of the disk type and, preferably, are provided with rubber tires as shown. These wheels are carried by independent axles 11 (Fig. 7) adjustably secured to the lower ends of the curved arms 12 (Fig. 4). The adjustable connection of one of the axles 11 to its arm 12 is illustrated in detail in Figs. 7 and 8, where it will be seen that the lower end of the arm 12 has a plurality of holes 13 in it for receiving bolts 14 that are used to connect the arm 12 to the head 15 of the axle 11. This provides a simple rugged connection that enables the front wheels to be adjusted to accommodate different sized tires. It will be appreciated that, if different sized tires were mounted on the wheels without adjustment, the level of the tractor would be disturbed and weight would be shifted to the front or to the rear wheels as the case might be; but, with the adjustment shown, the tractor can be kept level and the weight properly distributed.

The upper ends of the curved arms 12 are rigidly fixed to vertical pivot shafts 20 in the form of tubes which are rotatably and slidably mounted in bracket arms 21 as later explained in detail. This permits the front wheels to be turned about vertical axes for steering and it is to be observed that the arms 12 are shaped so that the center of the surface of contact of the wheel with the ground is in the axis about which the wheel turns. This promotes easy steering, reduces wear on the tires and reduces strain and wear on the mounting to a minimum.

The construction and arrangement of the pivot shafts 20 and the arms 21 is the same for each of the front wheels, and only one will be described.

Referring to Fig. 7, the arm 12 preferably is fixed to the pivot shaft or tube 20 by welding. The tube projects into a cylindrical opening 22 in the bracket arm 21, the lower end of said opening being provided with a sleeve 23 snugly fitting the tube in such a way as to permit both sliding and rotating movement of said tube. The lower end of the opening 22 is closed by a grease retaining ring 24. Fixed to the upper end of tube 20, preferably by welding, is the enlarged lower end 25 of a shaft 26 to which the steering means is connected as will be presently explained. It will be noted that the arm 12, the tube 20, and the shaft 26 form an integral unit which can both slide and rotate.

The tube 20 can slide up and down in the opening 22 in the bracket arm 21 against the tension of a spring 30. This spring, which is mounted inside the tube 20, bears against the tube by abutting against a screw-threaded plug 31 in the lower end of said tube. By turning the screw plug 31 the spring 30 can be compressed or released to vary the nature of the yielding mounting of the wheel as will presently appear. The upper end of the spring abuts against a thrust cage comprising a circular plate 32 (Figs. 7 and 9) to which four rods 33 fixed. The plate 32 has a hole in its center to prevent a pumping action on the oil or grease in the tube. These rods extend upwardly and loosely through openings in the head 25 of the shaft 26 and their upper ends are fixed to a thrust plate 34 that engages a thrust bearing 35 positioned in a head 36 bolted to the upper end of the bracket arm 21. The thrust plate 34 and thrust bearing 35 also form a bearing for shaft 26. The upper end of the head 36 is closed by a grease retaining ring 37. A cylindrical hood 38 is fixed to the upper end of shaft 26 to cover and protect the upper end of the mounting.

This mounting permits the tube 20 and the arm 12 supporting the front wheel 10 to be turned for steering and, at the same time, permits the wheel and its supporting arm and tube to move up or down against the tension of spring 30; or, to put it the reverse way, the weight of the tractor is carried by the spring 30 bearing against the wheel support.

Preferably, the interior of the opening 22 in the bracket arm 21 is filled with grease or oil which is retained by the lower and upper grease retaining rings 24 and 37. This enables the tube 20, the spring 30, the thrust cage, and the shaft 26 to operate in a bath of grease and oil to provide proper lubrication at all times.

The lower end of the bracket arm 21 is bifurcated to provide an upper lip 40 and a lower lip 41, the lower lip being longer than the upper. The front end of the tractor frame 1 has a steel casting 42 bolted to it (Fig. 6). To the outside corners of this steel casting are welded circular steel plates 43 (Fig. 7) which plates are thus made integral with the casting. A hole is provided through the center of each steel plate and through the casting for the reception of bolts 44 which forms pivots for the arms 21, said bolts passing through the lower lip 41 of each arm.

In order to provide for different positions for the arms 21, the plates 43 and casting 42 are provided with a plurality of holes 45 as shown in Fig. 6. Five holes have been illustrated in order to provide five different adjustments for each of the front wheels. Both the upper and lower lips 40 and 41 of the arms 21 are provided with openings 46 and 47 (Fig. 7) that will register with the openings 45. A bolt 48 passes through the openings to rigidly hold the arms 21 in the adjusted position to which they have been moved. A steel cross plate 50 is bolted to the tractor by bolts 51 against a spacer 52. This plate extends across the front of the tractor, as shown in Fig. 4, and both the pivot bolts 44 and the holding bolts 48 pass through it, the plate 50 being provided with a plurality of holes corresponding to holes 45 in order to receive bolt 48 in all the adjusted positions of arms 21. This cross piece aids in rigidly holding the arms 21 in the positions to which they are adjusted.

This mounting for the arms 21 provides a construction that rigidly holds the arms in the positions to which they are adjusted, and, at the same time, permits these positions to be changed readily, without eliminating any parts and without requiring the addition of any parts. The operator takes out the bolts 48 and loosens the bolts 51 and 44 which leaves the arms 21 free to turn about their pivots 44. He can then free the steering means from shaft 26, as will be later explained, which leaves the front wheels 10 together with the arm 21 free to be turned. He can then turn each front wheel about a vertical axis, tube 20 turning in bracket arm 21, so as to have each wheel in a position to enable its arm 21 to be swung with its wheel rotating on the ground. In other words, the arms 21 can be adjusted without jacking up the tractor. When the arms are in their new positions, he can insert the bolts 48, tighten the nut, put the steering means in place, and he is ready to use the tractor with the new adjustment.

The front wheels are steered by means of the steering wheel 60 (Fig. 1) having a steering post or shaft 61 extending forward to the front end of the tractor (Fig. 5). The forward end of this steering post carries a beveled pinion 62 meshing with a beveled ring gear 63 fixed to a vertical shaft 64 (Figs. 5 and 7) journaled in the steering frame 65. This vertical shaft has two spur gears 66 and 67 (Fig. 7) fixed to it. Meshing with spur gear 66 is a sprocket chain 68 that, in turn, meshes with a spur gear 69 fixed to a steering shaft 70. The spur gear 67 has a chain 71 meshing with it which extends to the other side of the tractor where it meshes with a gear 72 fixed to a shaft 73. Fixed to the shafts 70 and 73, respectively, are steering arms 75 and 76 having balls 77 and 78 on their ends fitting into sockets in the ends of drag links 80 and 81, respectively. The other ends of these drag links have sockets in them which fit over balls on the ends of steering arms 82 and 83, respectively, that are connected to the respective shafts 26 that control the two front wheels. The steering arm 82 (Fig. 7) is connected to its shaft 26, and the arm 75 is connected to its shaft 70, by providing conical serrated sockets in the ends of the arms which fit over the tapered, serrated ends of the shafts, the arms being held in place by nuts. This provides a connection that permits of easy adjustment and also one that insures that the arms will not turn on the shafts. In operation, by way of example, assume that the steering wheel 60 (Fig. 5) is turned clockwise as viewed from the rear of the tractor (Fig. 5). The shaft 64 will be turned clockwise, and so will the shafts 70 and 73. This will thrust the link 81 to the left in Fig. 5 and pull the link 80 in the same direction. The two front wheels will be turned about their vertical axes to turn the tractor to the right. While this is occurring, the tubes 20 may move up and down independently in bracket arms 21 against the tension of springs 30. The up and down movement of tubes 20 is transmitted to shafts 26 and to arms 82 and 83 to which links 80 and 81 are connected, but because of the universal connection and because this up and down movement is not great, such movement does not interfere with the proper steering of the wheels. In other words, the wheels are free to move up and down and yet, at the same time, they can be steered as desired.

In order that the steering means may operate efficiently in all the adjusted positions of the arms 21, the axes of the steering shafts 70 and 73 are coincident with the axes of the bolts 44 about which the arms 21 turn. This means that, no matter what the position of the arms 21 may be, the distance of the shafts 26 from the respective steering shafts 70 and 73 is always the same. The drag links 80 and 81 can thus be used in all the adjusted positions of the arms 21. These drag links are each made in two parts, one of which parts has a portion that telescopes into the other part, the two being held together by bolts as shown in Fig. 7. This permits the effective length of the links to be varied if desired. When the arms 21 are adjusted to new positions the steering arms and their links are lifted off of shafts 26, and then remounted after the arms 21 are in their new positions, the preferred practice in mounting the arms being to have the arms 82 and 83 at right angles to the vertical planes of the arms 21.

Fig. 5 illustrates several adjusted positions of the front wheels 10. The full line position shows the arms 21 at right angles to the longitudinal axis of the tractor which spaces the front wheels 10 a maximum distance apart, which is the spacing ordinarily employed for plowing. The dot-dash center positions show the wheels in their closest adjusted position, in which position the arms 21 are substantially parallel to the longitudinal axis of the tractor and the front wheels are close together and forward of the tractor frame. This is the position ordinarily employed for cultivating corn. The other dot-dash position is in an intermediate position that may be used for other row crops or other purposes. In order not to confuse the illustration, only three positions of the front wheels are shown, but this number can be varied and, in fact, the embodiment of the invention shown provides for five adjustments, as will be clear by reference to Fig. 6, where five different holes are shown for the receipt of the bolt 48 that holds the arms 21 in place.

This tractor has a large number of advantages and is adapted for a wide variety of uses, as will now be explained.

Referring to Fig. 13, the tractor is shown with the wheels in the position they ordinarily occupy for cultivating corn, the rows of which are 42 inches apart. The rear wheels are spaced far enough apart to straddle two corn rows, which is about eighty-four inches, while the front wheels are close together and will run between two rows. This position of the front wheels corresponds to the side view of Fig. 2 and the front view of Fig. 3.

Fig. 12 illustrates the position of the wheels for cultivating row crops where the rows are twenty inches apart. The rear wheels remain approximately as in Fig. 13, that is, about eighty inches apart, and straddle four rows. The front wheels are spread apart slightly and swing slightly to the rear, so they will straddle two rows. Each front wheel can easily run between these narrow rows, but it can be readily appreciated that, if the front wheels were in the position of Fig. 13, which is the approximate permanent position of the front wheels of present day tractors, the two wheels would have to run between two rows and each wheel would be so near its row that much of the crop would be damaged.

Fig. 11 shows the tractor adjusted to cultivate row crops that are only 12 inches apart. The rear wheels are slightly closer together to space them the correct distance to straddle six rows. The front wheels are farther apart, which moves them slightly to the rear, and enables them to straddle four rows. It will be readily apparent that with the ordinary tractor having the wheels located as in Fig. 13, row crops such as illustrated in Fig. 11 could not be cultivated, because the front wheels would not run between two rows and would be too close together to safely straddle the rows.

Fig. 10 illustrates the tractor as it is used for plowing. In this adjustment, the two rear wheels are brought closer together, and the two front wheels are swung to their widest separated position, where the arms 21 are at right angles to their longitudinal axis of the tractor. This brings the front wheels in line with the rear wheels, and the front wheels back to the rear so that their axis is under the front end of the tractor. With this arrangement, when the tractor is used for plowing, as illustrated in Fig. 10, the right front wheel and the right rear wheel run in the furrow, which means that the tractor plow can be connected to the center line of the tractor instead of being connected to one side as heretofore necessary. This not only relieves the tractor of strain, but makes it much easier to steer because the right front wheel tends to run in the furrow and the operator can watch it as it runs in this well-defined path. Steering becomes a simple matter as compared with steering a tractor whose front wheels run on rough unplowed ground. If one wheel strikes an obstruction tending to turn it, the action is not transmitted to the other wheel as is ordinarily the case. Instead, the other wheel continues in its position and tends to keep the tractor in line.

In addition to the adaptability of the tractor for many lines of work, an advantage is that the individual mounting of the front wheels enables them to adjust themselves to unevenness of the ground and to divide the tractor weight under such conditions as distinguished from a wheel assembly that carries both front wheels as a unit. When such an assembly moves over uneven ground, the weight of the tractor shifts from one front wheel to another.

The individual mounting for the front wheels, together with the spring action, also gives a "knee-action" effect that improves the riding qualities of the tractor when it is used in cultivating row crops, and where the tractor is used for industrial work. This easy riding is particularly noticeable in cross-cultivation of row crops; that is, cultivation at right angles to the direction of the prior cultivation.

A further advantage of the individual wheel mounting is that the tractor can be turned within approximately its own length, as there is plenty of clearance for the wheels in all of their positions to enable them to be turned at almost right angles to the longitudinal axis of the tractor.

In all of the positions of the front wheels, there is high clearance at the front of the tractor and plenty of side clearance between the tire and the supporting arm of the wheel so that clogging and "piling up" is eliminated entirely, whereas in constructions where the two front wheels are quite close together as a unit and when there is a low front axle construction the wheels sometimes become clogged with trash or pile up trash or dirt so that they slide instead of roll.

The swinging of the wheels from a separated rear position to a front position not only distributes the weight of the tractor but it also provides a space for "hang-on" implements, and enables the weight of such implements to be properly distributed. For example, a four-row corn cultivator can be attached to the front end of the tractor, and ample space for the cultivating rigs is available at the sides of the front wheels, the latter being then in forward position. When the wheels are swung to the rear for plowing, the tractor weight is again properly distributed, this time for plowing.

The location of the front wheels is such that they are directly under the pivot points about which they are turned in steering, which minimizes wear on the tires and makes steering easy.

The vertical adjustment of the front wheels on the arms 21 enables different sizes tires to be used with the weight of the tractor properly distributed between the front and rear wheels.

The tractor adapts itself for listing in a most advantageous way because the front wheels can be spaced to run in the lister rows instead of on the ridges, and the tractor becomes practically self-steering.

The adjustment for the springs 30 in the individual wheel mountings by screw-threaded plug 31 enables these mountings to take care of the varied weight of hang-on implements and still maintain the tractor at the proper level and with the proper distribution of weight.

An important advantage in connection with the adjustment of the front wheels is that no parts are added or eliminated in making the several adjustments. Thus, there are no parts to be lost. There are very few parts to be adjusted, and it is not necessary to have special apparatus to lift up or hold the front end of the tractor. One man can make the adjustment easily by rolling the front wheels around to their required position.

From all of the above, it will be clear that the invention not only improves the qualities of present day tractors, but greatly extends their field of usefulness. Instead of purchasing a tractor for row crop cultivation and then using the tractor for plowing even though it is not efficient for that purpose, the farmer now has a tractor that is just as efficient and useful for plowing as for row crop cultivation. He can use it to cultivate a wide variety of crops without danger of destroying any of them because the wheels can be adjusted so as to have ample clearance for any type of row crops, in addition to which the tractor has better riding qualities, better steering qualities, better weight distribution, and more flexibility for adjustment for different size tires.

It is understood that the construction shown is for purposes of illustration only, and that variations may be made in it without departing from the spirit and scope of the invention as defined by the appended claims.

I claim:

1. A tractor of the class described having spaced rear drive wheels, an engine and driving connections for said rear wheels, a pair of arms pivotally mounted on the front of said tractor to enable them to be swung about substantially vertical axes to different adjusted positions, means for firmly holding said arms in the positions to which they are adjusted, each of said arms having wheel mounting devices associated with it for supporting a front wheel so that the wheel for said arm may be turned about an individual vertical axis for steering and so that said wheel may have a limited and independent vertical movement to adjust itself to unevenness in ground levels, and steering means connected to said mounting devices operable to turn said wheels about their vertical axes in all positions of said wheels.

2. A tractor of the class described having spaced rear drive wheels, an engine and driving connections for said rear wheels, a pair of arms pivotally mounted on the front of said tractor to enable them to be swung about substantially vertical axes from a position substantially parallel with the longitudinal axis of said tractor to a position substantially at right angles to said axis, means for firmly holding said arms in said positions and in intermediate positions between said two positions, individual wheel mounting devices on each of said arms supporting a front wheel so that said wheel may be turned about a substantially vertical axis for steering, and steering means connected to said mounting devices to turn said front wheels about their vertical axes in all adjusted positions of said arms.

3. A tractor of the class described having spaced rear drive wheels, an engine and driving connections for said rear wheels, a pair of arms pivoted to the front of said tractor to enable them to be swung about substantially vertical axes to different adjusted positions, means for firmly holding said arms in their different adjusted positions, a mounting device on each of said arms carrying a front wheel so that said wheel may be turned about a substantially vertical axis for steering, and steering means for said front wheels, said steering means including a steering arm for each wheel turnable about the vertical axis about which its wheel is turnable, another arm turnable about the vertical axis about which the arm for said wheel is swingable, a link connecting one arm to the other, and steering mechanism for moving said arms and links.

4. A tractor of the class described having spaced rear drive wheels, an engine and driving connections for said rear wheels, a pair of arms pivotally mounted on the front of said tractor to swing about substantially vertical axes to different adjusted positions, means for firmly holding said arms in their different adjusted positions, a wheel mounting device on each arm supporting a front wheel so that said wheel may yieldingly move up and down relative to said arm and so that said wheel may be turned about a substantially vertical axis for steering, the center of the surface of contact between the wheel and the ground being substantially in line with the vertical axis about which the wheel may be turned, a steering arm connected to each wheel mounting device to turn its wheel, said arm being turnable about the vertical axis about which the wheel may be turned, another steering arm for each wheel turnable about the vertical axis of its pivoted arm, connections between said two arms, and steering mechanism for turning said arms.

5. A tractor of the class described having rear drive wheels, an engine and driving connections for said rear wheels, a pair of arms pivoted to the front of said tractor to swing about substantially vertical axes to different adjusted positions, a fixed plate for each arm supported by the tractor and having a plurality of holes in it with which a hole in the arm may be brought into register so that a bolt may be inserted in said registering holes to hold said arm in adjusted positions, and a cross plate extending between the two arms having holes in it that may be brought into register with the holes of both arms to enable said cross plate to receive said bolts and thereby assist in holding said arms in adjusted positions.

6. A tractor of the class described having spaced rear drive wheels, a narrow compact frame positioned along the longitudinal center line of the tractor for supporting the engine and its associated mechanism for driving the tractor, a pair of arms pivoted on said tractor frame at the front to swing about substantially vertical axes, said arms extending outwardly and upwardly from said frame to provide crop clearance, a shaft journaled in the outer end of each arm to turn about a vertical axis, a front ground wheel journaled on each shaft to turn about a horizontal axis with the ground contact of each wheel in line with the vertical axis of the shaft carrying it, means for holding said arms in different adjusted positions when said arms are swung about their pivots to thus enable the front wheels to be held in a variety of different spacings, and steering means constructed and arranged so that it may be easily connected to said wheel supporting shafts in all positions of said arms to enable said wheels to be easily steered in all their different spacings.

7. A tractor of the class described having spaced rear drive wheels, a narrow compact frame positioned along the longitudinal center line of the tractor for supporting the engine and its associated mechanism for driving the tractor, a pair of arms pivoted on said tractor frame at the front to swing about substantially vertical axes, said arms extending outwardly and upwardly from said frame to provide crop clearance, a shaft mounted in the outer end of each arm to turn about a vertical axis and to have a limited sliding movement relative to its arm in a vertical direction, yielding means between each shaft and its arm to cushion said sliding movement, a front ground wheel journaled on each shaft to turn about a horizontal axis with the ground contact of each wheel in line with the vertical axis of the shaft carrying it, means for holding said arms in different adjusted positions when said arms are swung about their pivots to thus enable the front wheels to be held in a variety of different spacings, and steering means constructed and arranged so that it may be easily connected to said wheel supporting shafts in all positions of said arms to enable said wheels to be easily steered in all their different spacings.

8. A tractor of the class described having spaced rear drive wheels, an engine and driving connections for said rear wheels, a pair of front, steering, ground wheels, individual axles for each of said front wheels, each axle having a substantially horizontal portion on which its wheel is rotatably mounted and a substantially vertical portion mounted to rotate in an individual bearing about a substantially vertical axis for steering purposes, an individual support for each bearing adjustably connected to the forward end of said tractor to enable each support to be swung bodily in an arc about a substantially vertical axis other than the axis about which its axle is turned for steering purposes to thereby move its wheel bearing and wheel to and away from the longitudinal center line of said tractor to vary the spacing of said front steering wheels, means for fastening said supports in their various adjusted positions, a steering arm connected to the vertical portion of each of said wheel axles, a steering mechanism on said tractor having individual steering arms mounted to oscillate about substantially vertical axes, and links connecting the respective steering arms on the steering mechanism with the arms on the vertical portions of the respective axles, said links having means to adjust their lengths to compensate for different fore-and-aft positions of said steering wheel supports when the spacing of the front wheels is changed.

9. A tractor of the class described having spaced rear drive wheels, an engine and driving connections for said rear wheels, a pair of supporting devices pivotally mounted on said tractor toward the forward end thereof so that they may be swung about individual and substantially vertical axes to different adjusted positions, bearings connected to the forward ends of said arms, an axle journaled in each of said bearings to turn about a substantially vertical axis, steering ground wheels rotatably mounted on substantially horizontal portions of said axles, means for fastening said supporting devices to said tractor in different adjusted positions to hold said steering wheels in different spaced relations, a steering arm connected to the vertical portion of each of said axles, and an adjustable link connected to each steering arm, said links extending toward and being connected to a steering mechanism on said tractor operable by a steering wheel at the rear of the tractor, said steering arms, links, and steering mechanism being so arranged and connected together that they may be adjusted to be operative to steer said front wheels in all the different spaced adjustments of said steering wheels without any change in or addition to said arms, links or steering mechanism.

EDWIN O. ASHLEY.